(12) United States Patent
Feuerman et al.

(10) Patent No.: US 9,143,329 B2
(45) Date of Patent: Sep. 22, 2015

(54) CONTENT INTEGRITY AND INCREMENTAL SECURITY

(75) Inventors: Kenneth Edward Feuerman, Fremont, CA (US); James Lewis Lester, Dublin, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1429 days.

(21) Appl. No.: 12/022,770

(22) Filed: Jan. 30, 2008

(65) Prior Publication Data

US 2014/0304515 A1    Oct. 9, 2014

(51) Int. Cl.
*H04L 9/32* (2006.01)
*H04L 29/06* (2006.01)

(52) U.S. Cl.
CPC .............. *H04L 9/3247* (2013.01); *H04L 63/00* (2013.01); *H04L 2209/60* (2013.01)

(58) Field of Classification Search
CPC .... H04L 9/3247; H04L 63/00; H04L 2209/60
USPC ........................................................ 713/176
See application file for complete search history.

(56) References Cited

U.S. PATENT DOCUMENTS

| | | | | |
|---|---|---|---|---|
| 5,612,742 A | * | 3/1997 | Krause et al. ............ | 375/240.25 |
| 6,421,343 B1 | * | 7/2002 | Jun et al. .................. | 370/395.72 |
| 6,904,020 B1 | * | 6/2005 | Love et al. ..................... | 370/252 |
| 7,043,637 B2 | * | 5/2006 | Bolosky et al. ............... | 713/171 |
| 7,761,919 B2 | * | 7/2010 | Gassoway ....................... | 726/24 |
| 2006/0288223 A1 | * | 12/2006 | Kiehtreiber et al. .......... | 713/176 |
| 2007/0250670 A1 | * | 10/2007 | Fineberg et al. .............. | 711/154 |
| 2008/0022128 A1 | * | 1/2008 | Proudler et al. .............. | 713/189 |

OTHER PUBLICATIONS

Andre Eickler ; A Performance Evaluation of OID Mapping Techniques; Year: 1995; Siteseer;pp. 1-12.*
Bellare et al., "Incremental Cryptography and Application to Virus Protection," Proceedings of the 27th ACM Symposium on the Theory of Computing, May 1995, available online at http://www.wisdom.weizmann.ac.il/~oded/p_bgg.html (last accessed Mar. 22, 2011).
Bellare et al., "Incremental Cryptography: The Case of Hashing and Signing," Advances in Cryptology Crypto 94 Proceedings, Lecture Notes in Computer Scince vol. 839, Springer-Verlag.,Y Desmedt, ed. 1994, dated Dec. 10, 1995, available online at http://www.wisdom.weizmann.ac.il/~oded/p_bgg.html (last accessed Mar. 22, 2011).

(Continued)

*Primary Examiner* — Monjour Rahim
(74) *Attorney, Agent, or Firm* — Kilpatrick Townsend & Stockton LLP

(57) ABSTRACT

A media signer produces an array of hash values including a respective hash value for each of multiple different portions of content. The media signer applies a hash function and an encryption key to the array of hash values to create a digital signature associated with the content. Prior to playback of the content, a media verifier retrieves the array of hash values for the different portions of content. The media verifier produces a hash value result for the retrieved array. Based on the hash value result for the retrieved array and a hash value result of the array in the received digital signature, the media verifier verifies the integrity of the retrieved array. If the retrieved array of hash values is found to be trustworthy, the media verifier determines the integrity of a portion of the content by verifying the portion's corresponding hash value from the "trustworthy" array.

16 Claims, 14 Drawing Sheets

(56) References Cited

OTHER PUBLICATIONS

Simon et al., "An Introduction to XML Digital Signatures," XML.com, dated Aug. 8, 2001, available at http://www.xml.com/pub/a/2001/08/08/xmldigsig.html (last accessed Mar. 22, 2011).

Wiley, "Dust," available at https://github.com/blanu/Dust#readme (last accessed Mar. 22, 2011).

* cited by examiner

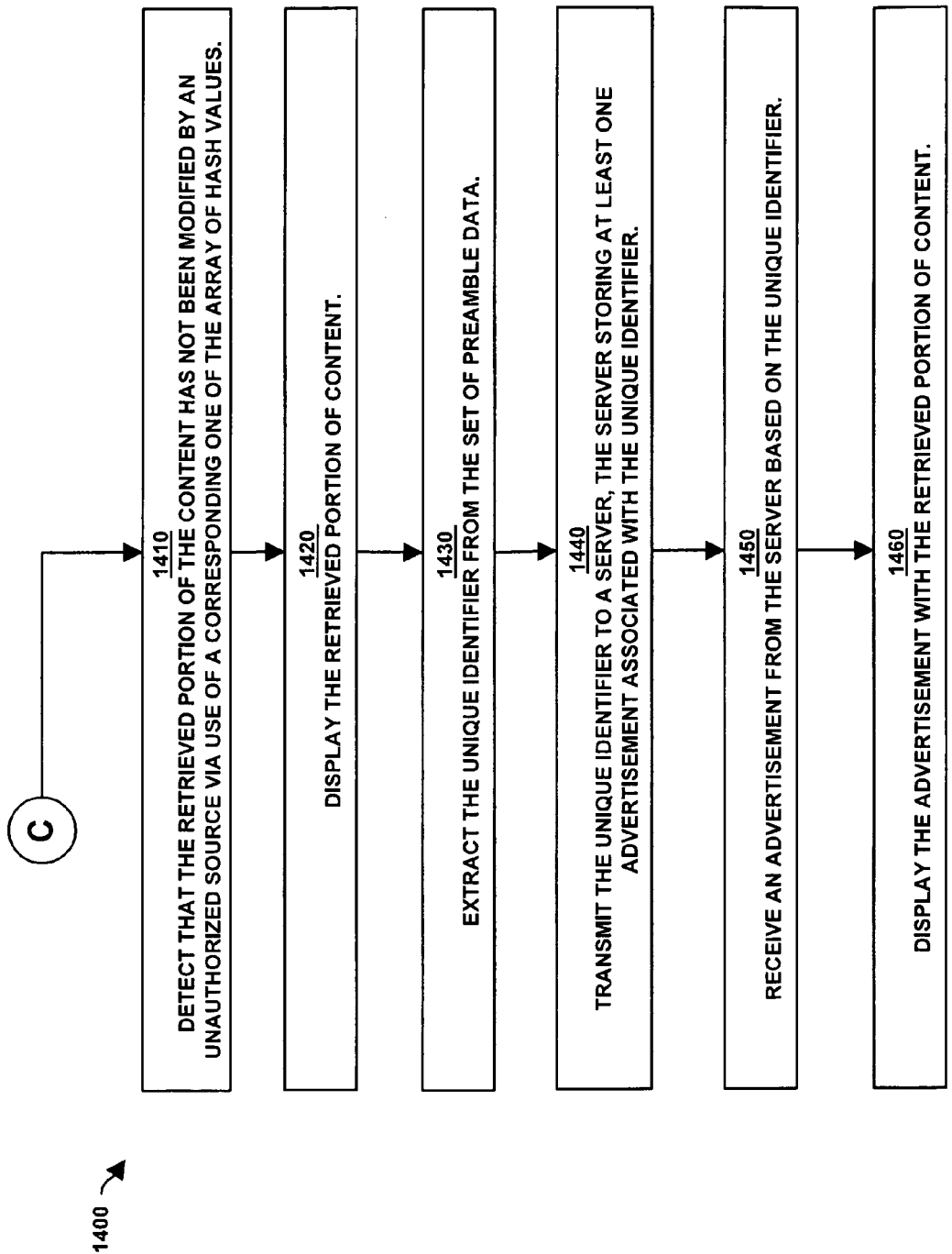

CONTENT INTEGRITY AND INCREMENTAL SECURITY

BACKGROUND

Conventional computer systems allow for the production and distribution of content such as video data, audio data, image data, text-based data, etc. Such distribution and production is increasing at a phenomenal rate due to the growing popularity of the Internet and the growing affordability of personal computers capable of efficiently processing and displaying content to users.

People now access and use content in numerous ways. One way that people access content is over a network. For example, persons using web browsers on personal computers can access content by surfing the World Wide Web via the Internet. Countless numbers of content providers link content to web pages accessed by persons using web browsers. Accordingly, persons using web browsers can access a web page from a web server operated by a content provider to view documents, video clips, listen to audio clips, or view images made available by the content provider.

In a typical application, when a client requests a piece of media content from a server, the client provides a global address associated with the content in the form of a Uniform Resource Locator (URL). Based on receiving a request at a location as specified by the global address, a server then accesses the content and sends or "streams" it to the client in accordance with an appropriate communication protocol.

There are various file formats for streaming media content and composite media streams. Regardless of the streaming file format used, an individual data stream may contain a sequence of digital data sets or units. The units can represent an image, sound, or some other stimuli "played back" to a viewer via a client.

The integrity of distributed media content can be enhanced using conventional security measures. For example, content can be digitally signed using conventional hashing and encryption techniques prior to being distributed for "playback" by one or more different users. A processing device receiving content can be configured to use the conventional digital signature to verify a trustworthiness of received content prior to play back of the digitally signed content. Conventional security techniques require verification of an entire grouping of media content before the user is afforded access to any segment of the media content.

SUMMARY

Conventional computer systems suffer from a number of deficiencies. For example, as discussed above, conventional systems can be configured to protect content integrity by producing a digital signature for a grouping of content as a whole. In order to verify the content using the conventional digital signature, a user must retrieve the content in its entirety and thereafter apply a conventional verifier function to the content as whole to determine whether the content has been tampered with or corrupted.

This conventional technique of verifying content can be an impediment to quickly displaying requested content. For example, a user may request to download a single page of a large multi-page document for viewing. Assume that the multi-page document happens to be digitally signed according to conventional techniques. Prior to displaying a page within the document and based on use of the conventional digital signature, the user must download the whole document and apply a conventional verifier function to the document as a whole to determine the integrity of the document. The download may take a substantial amount of time due to a length of the document. This affects how quickly a requested page of the document can be displayed. To view a single requested page of the multi-page document, the user may have to wait to download and verify all portions of the document, even those that will not be viewed by the user.

Certain example embodiments as discussed herein significantly overcome the deficiencies of conventional applications such as those discussed above. For example, certain specific embodiments herein are directed to a computer environment for providing improved content integrity over conventional methods.

More specifically, according to one embodiment, a media signer parses content (e.g., a multi-page .pdf document, a movie, a music album, a slide presentation) into portions (e.g., single pages, video chapters, songs, single images, etc.). The media signer produces a hash value for each portion of multiple portions of the content to produce an array of hash values. Additionally, the media signer applies a hash function to the array of hash values to produce a hash value result. In an example embodiment, the media signer then utilizes the hash value result to create a digital signature for the content by applying an encryption key (e.g., a private key) to the hash value result.

After creating the digital signature, the media signer associates the digital signature with the content for distribution of the content to one or more remote devices that perform operations such as play back of the content. The array of hash values associated with the content can also be made available for distribution to the one or more remote devices receiving the content for verification purposes. As an example, prior to play back of the content on a remote device such as a media player, a media verifier configured according to embodiments herein utilizes the digital signature to first verify an integrity of a retrieved array of hash values associated with the content.

More specifically, a media verifier retrieves the array of hash values associated with the content. Note that the array of hash values can be retrieved by the media verifier along with one or more requested portions of content. However, the content in its entirety (i.e. all portions of content) need not be retrieved to determine the integrity of a particular requested portion of content.

Initially, it is unknown whether the retrieved array of hash values is "trustworthy." To verify an integrity of the retrieved array of hash values, the media verifier applies a hash function to the retrieved array of hash values and decrypts the digital signature using an appropriate decryption key. To complete a verification of the retrieved array of hash values, the media verifier compares the decrypted digital signature with the hashed retrieved array of hash values. If they are equivalent, then the retrieved array passes the verification test. If not, the retrieved array does not pass the verification test.

When the media verifier detects that the retrieved array is "untrustworthy" (e.g., because it was been modified by an unauthorized source, because there was a communication error during transmission of the array, etc.), the media verifier reports such detection to the media player, which determines the appropriate use of the content represented by the "untrustworthy" array. For example, in one embodiment, in response to determining that an array is untrustworthy (e.g., fails a security check), the media player can merely provide an indication of a tampered status of the media. According to another embodiment, the media player can refuse or prevent play back of content in response to detecting that the array is untrustworthy.

However, when the media verifier detects that the array of hash values is "trustworthy" based on the above verification test, the media verifier enables use of the retrieved array for use in determining the integrity of any of the multiple different portions of content. For example, a user of a media player may request to view a particular portion of the content. In order to determine the integrity of the particular portion of content, the media verifier first receives the particular portion of content. Thereafter, the media verifier applies a hash function to the particular portion of content to produce a hash value result for the retrieved particular portion of content. The media verifier then retrieves a hash value from the retrieved array of hash values (e.g., which was found to be "trustworthy") that corresponds with the particular portion of content. The media verifier then compares the hash value result produced for the particular portion of content with the hash value extracted from the retrieved array of hash values to determine an integrity of the received particular portion of content.

If the received portion of content's integrity is "trustworthy" based on the comparison (e.g., because there is a match), the media verifier can enable use (e.g., display) of the particular portion of content. If the media verifier determines that the particular portion of content is "untrustworthy" based on the comparison, the media verifier can prevent use (e.g., display) of the particular portion of content.

Example embodiments as described herein are advantageous over conventional techniques. For example, conventional techniques such as those discussed above in the background do not allow for determining which pages of a document are corrupted and which are still valid because the conventional verification test is based on an entirety of content rather than portions of content. Failure of the conventional verification test results in the inability to view any portions of the content. The user in such circumstances, therefore, may be prevented from viewing a desired page even though it may be that another page in a retrieved document that happens to be corrupted. In contradistinction and according to embodiments herein, if a retrieved array of hash values passes the verification test, then the array of hash values can be used to verify each requested portion of the content on a case-by-case basis. Those portions of content that pass the verification test can be displayed to a user.

Thus, example embodiments as discussed herein contrast with conventional systems because they can be used to detect whether a portion of content has been altered by an unauthorized source without requiring access and application of a verifier function to the content in its entirety. Further, example embodiments herein enable a user to access and view non-corrupted portions of a document even though other portions of the same document may be corrupted and, therefore, not usable.

Note that in addition to the media signer and media verifier, other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium (e.g., tangible computer-readable medium) including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in software and hardware such as those manufactured by Adobe Systems Incorporated of San Jose, Calif., U.S.A., herein after referred to as "Adobe" and "Adobe Systems."

As discussed above, techniques herein are well suited for use in computer applications such as those used to digitally sign and verify content. However, it should be noted that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, at least some example configurations as described herein can be embodied and viewed in many different ways.

Note also that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention and example embodiments, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of an environment with a media signer and a media verifier, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

FIGS. 12-14 combine to form an example flowchart illustrating verification of an array of hash values and different portions of content according to embodiments herein.

DETAILED DESCRIPTION

According to embodiments herein, a media signer produces an array of hash values including a respective hash value for each of multiple different portions of content. The media signer applies a hash function and an encryption key to the array of hash values to create a digital signature associated with the content.

Prior to playback of the content, a media verifier retrieves the array of hash values for the different portions of content. The media verifier produces a hash value result for the retrieved array. Based on the hash value result (as derived by the media verifier) for the retrieved array and a corresponding hash value result for the array in the received digital signature, the media verifier verifies the integrity of the retrieved array. In other words, according to one embodiment, the media verifier checks a trustworthiness of the retrieved array of hash values by verifying that the hash value produced for the retrieved array is equivalent to the hash value in the digital signature. If the retrieved array of hash values is found to be "trustworthy" (e.g., that the array has not been modified by an unauthorized source), the media verifier determines the integrity of content portions by processing the hash values in the "trustworthy" retrieved array as discussed in more detail below.

Figure 1:
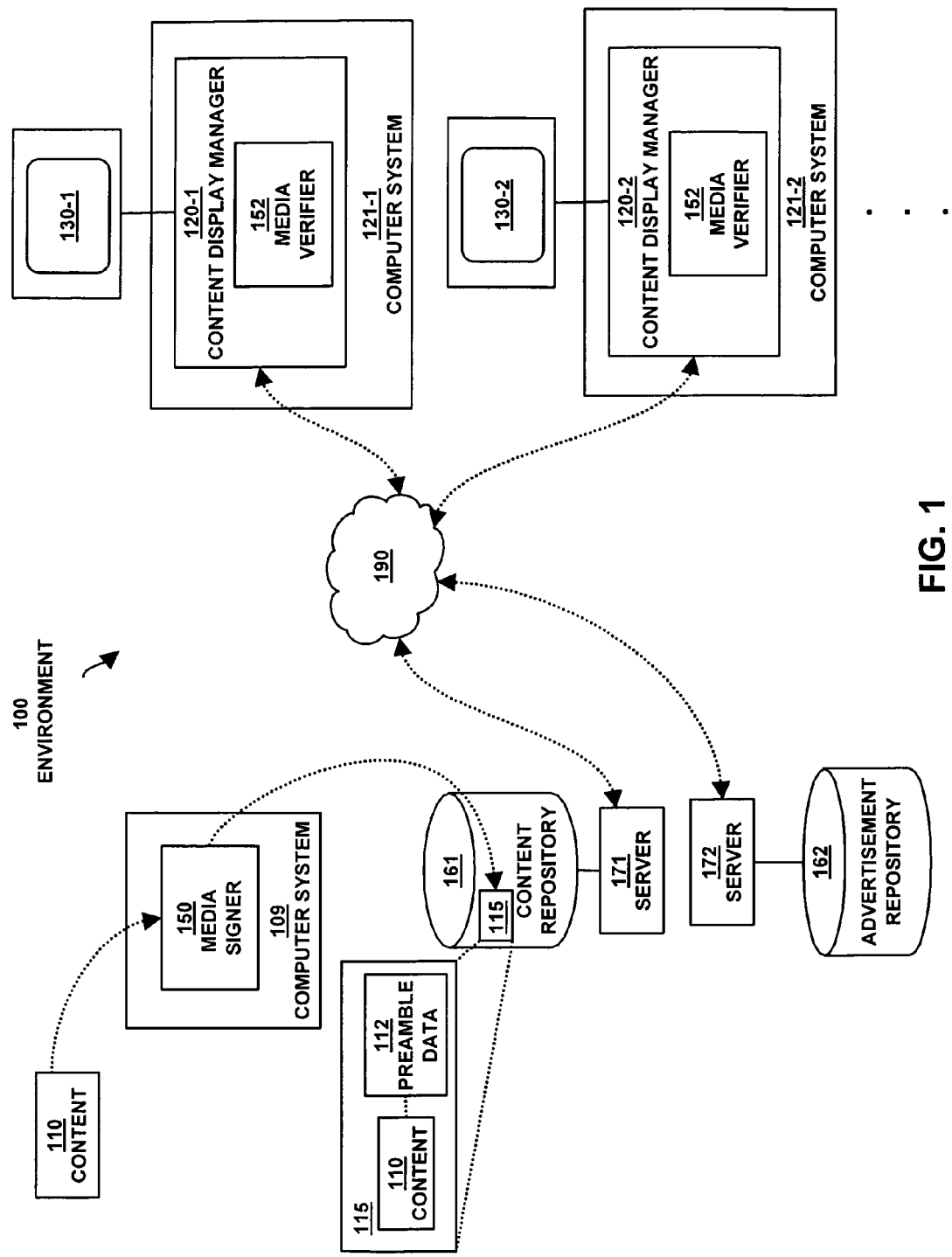
FIG. 1 is a block diagram of an example of an environment including a media signer and a media verifier for securing data according to embodiments herein.

Turning now to FIG. 1, FIG. 1 is a block diagram of an example of an environment 100 that includes a media signer 150 and a media verifier 152 according to embodiments herein. In general, as shown in FIG. 1, a media signer 150 produces security information for associating with content 110 and portions thereof. The media signer 150 stores the security information in preamble data 112. Repository 161 stores the preamble data 112 (including security information) as well as content 112 for distribution to remote computers. Computer systems 121 retrieve the content for playback on corresponding display screens 130. Prior to playback, however, content display manager executing on the remote computer systems 121 utilize corresponding media verifiers 152 to detect (e.g., via processing of security information in the preamble data 112 and processing of the content 110) whether content 110 (or portions thereof) can be played back for viewing.

More specifically, as illustrated in FIG. 1, media signer 150 runs on a computer system 109 and generates preamble data 112 based on content 110 processed by the media signer 150. As mentioned above, the preamble data 112 can include security data such as an array of hash values used for verifying content 110 as further discussed below in the following figures.

After generating the preamble data 112, the media signer 150 associates the preamble data 112 with the content 110 and stores the preamble data 112 and content 110 at a location 115 in a content repository 161.

Data stored in the content repository 161 is accessible over a network 190 via a server 171.

Computer systems 121 (e.g., computer system 121-1, computer system 121-2, . . . ) communicate over network 190 to retrieve content 110 (or portions thereof) from repository 161 for playback of the content 110 (or portions thereof on respective display screens 130 (e.g., display screen 130-1, display screen 130-2, . . . ). As an example, a content display manager 120-1, which runs on a computer system 121-1, can send a request over network 190 to server 171 for retrieval and viewing of one or more portions of the content 110.

In response to the request for the portion(s) of content 110, the server 171 sends the preamble data 112 as well as the portion(s) of content 110 to the content display manager 120-1.

In one embodiment, the media verifier 152, running within the content display manager 120-1, processes the preamble data 112 to determine an integrity of at least a portion of the preamble data 112. If the preamble data 112 (e.g., an array of hash values) is found to be "trustworthy," then security information such as hash values in the preamble data 112 can be used to determine the integrity of any portion of content 110 that is received from the content repository 161.

As an example, upon receipt of the desired portion of content 110, the media verifier 152 extracts a hash value (from the security information in the preamble data 112) that corresponds with the desired portion of content 110 to be processed or displayed. The media verifier 152 processes the extracted hash value to determine the integrity of the received portion of content 110.

If the media verifier 152 determines that the received portion of content 110 is "trustworthy", then the content display manager 120-1 displays the "trustworthy" portion of content 110 on a display screen 130-1. However, if the received portion of content 110 is "untrustworthy", then the content display manager 120-1 will not display the "untrustworthy" content portion. A "trustworthy" state of data signifies that data (e.g., metadata, array, hash value, preamble data) has not been corrupted by an unauthorized alteration. An "untrustworthy" state of data signifies that data has been likely been modified by an unauthorized source.

In one embodiment, the preamble data 112 can include an identifier value specifying advertisements that are related to the subject matter of the content portion being displayed on display screen 130-1. For example, a server 172, in communication with an advertisement repository 162, can receive an identifier value retrieved from the preamble data 112 and forwarded by the content display manager 120-1 to the server 172. Based on the identifier value, the server 172 locates advertisements in the advertisement repository 162 and transmits the advertisements to the content display manager 120-1. The advertisements can thereby be displayed on the display screen 130-1 along with a requested portion of content 110.

Note that the above discussion and example illustration are shown by way of example only and that the media verifier 152 can also be separately and concurrently running on multiple computer systems. For example, the media verifier 152 can be implemented within another content display manager 120-2 on a separate computer system 121-2 that has its own display screen 130-2.

More specific details associated with media signer 150, preamble data 112, and media verifier 152 will now be discussed with respect to FIGS. 2-6.

Figure 2:
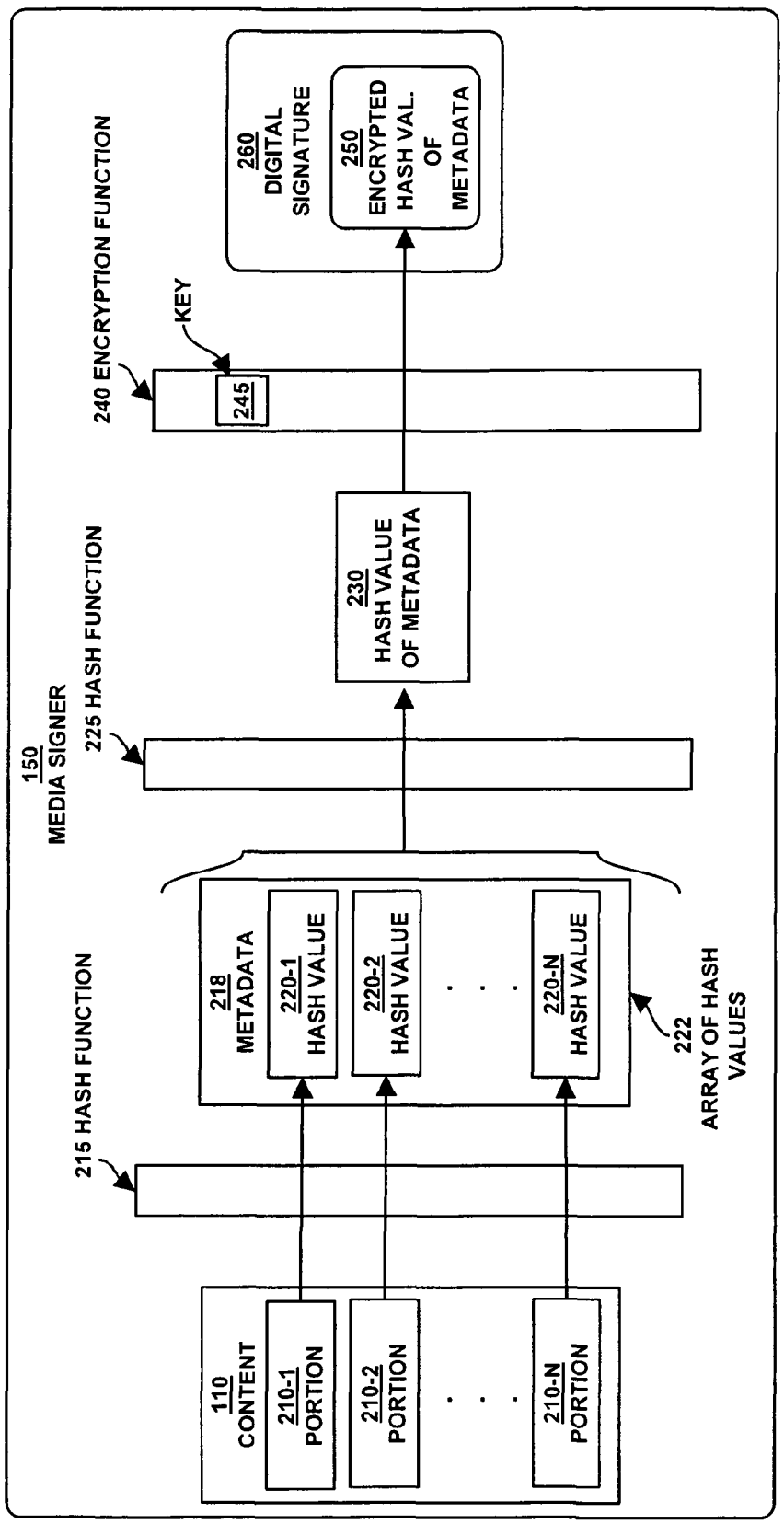
FIG. 2 is a block diagram of an example of a media signer according to embodiments herein.

FIG. 2 is a block diagram of an example of a computer system configured with a media signer 150 according to embodiments herein. As shown, the media signer 150 applies a hash function 215 to each of multiple portions 210 (e.g., portion 210-1, 210-2 . . . 210-N) of content 110.

A corresponding portion 210 of the content 110 can be a predefined set of data associated with the content 110. For example, a portion 210 can include a set of bit information representing a page, paragraph, or section of a document, a segment of video, a segment of audio data, etc.

The media signer 150 generates a corresponding hash value 220-1 based on applying hash function 215 to portion 210-1; the media signer 150 generates a corresponding hash value 220-2 based on applying hash function 215 to portion 210-2; the media signer 150 generates a corresponding hash value 220-3 based on applying hash function 215 to portion 210-3; and so on for each of the N values.

In one embodiment, the media signer 150 produces metadata 218 by organizing and storing the hash values 220-1, 220-2 . . . 220-N as an array of hash values 222.

In addition to producing the array of hash values 220, the media signer 150 applies a hash function 225 to the metadata 218 (including the array of hash values 222) to create a hash value 230 of the metadata 218. Thus, hash value of metadata 230 is a resulting "hash" of the array of hash values 222.

Note that metadata 218 is not limited to including only hash values 220. For example, metadata 218 can include other information relating to content 110 such as type information, version information, date of creation information, modification history information, user history information, etc.

After creating the hash value of the metadata 218, the media signer 150 applies an encryption function 240 and encryption key 245 (e.g., a private key) to the hash value 230 of the metadata 218 in order to produce an encrypted hash value 245. In one embodiment, the encrypted hash value of the metadata 250 is utilized to create a digital signature 260 for associating with the content 110.

Figure 3:
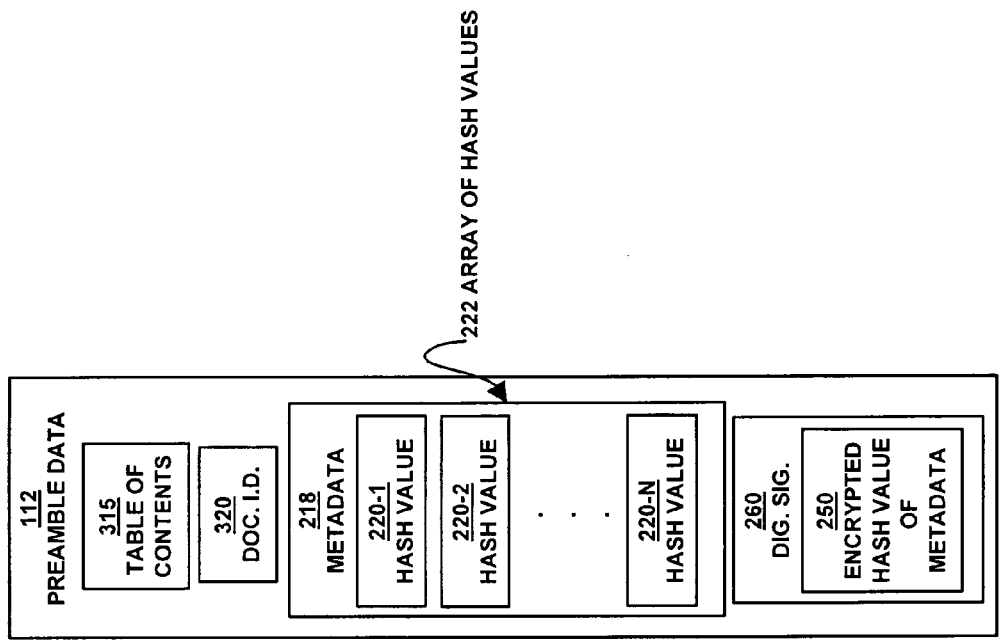
FIG. 3 is a block diagram of an example of preamble data according to embodiments herein.

FIG. 3 is an example block diagram of preamble data 112 associated with content 110 according to embodiments herein. As depicted in FIG. 3, the preamble data 112 includes a table of contents 315, which describes characteristics of each portion 210-1, 210-2 . . . 210-N of the content 110, and a document identifier 320 (i.e. a unique identifier value) that is associated with the content 110. When the content 110 is retrieved for playback purposes, the table of contents 315 can be used (by a corresponding media player function) to determine parameters such as the size of each portion 210-1, 210-2 . . . 210-N of the content 110, as well as each portion's 210-1, 210-2 . . . 210-N placement in the content 110, etc.

The preamble data 112 also includes metadata 218 associated with the content 110. The metadata 218 includes an array 222 of hash values 220-1, 220-2 . . . 220-N generated by media signer 150 in a manner as discussed above. Each of the hash values 220-1, 220-2 . . . 220-N corresponds with a particular 210-1, 210-2 . . . 210-N portion of the content 110.

Thus, the array 222 can store hash values for an arbitrary number of distinct portions of content (i.e. audio, videos, images, documents, etc.)

The preamble 112 also includes a digital signature 260. In one embodiment, the digital signature 260 includes an encrypted hash value of metadata 250, which is generated as discussed above.

Note that the discussion of the preamble data 112 including the table of contents 315, the document identifier 320, the metadata 218 and the digital signature 260 is shown by way of example and that the preamble 112 can be organized, parsed, maintained, etc. in a variety of ways.

As previously discussed, after generation of the preamble data 112, the content 110 and corresponding preamble data 112 are made available for distribution to remote media players over a network. As discussed above and as discussed further below, the media verifier 152 at each remote media player utilizes the preamble data 112 to verify the integrity of received metadata and content 110 without requiring each remote media player to download the content it is entirety.

Figure 4:
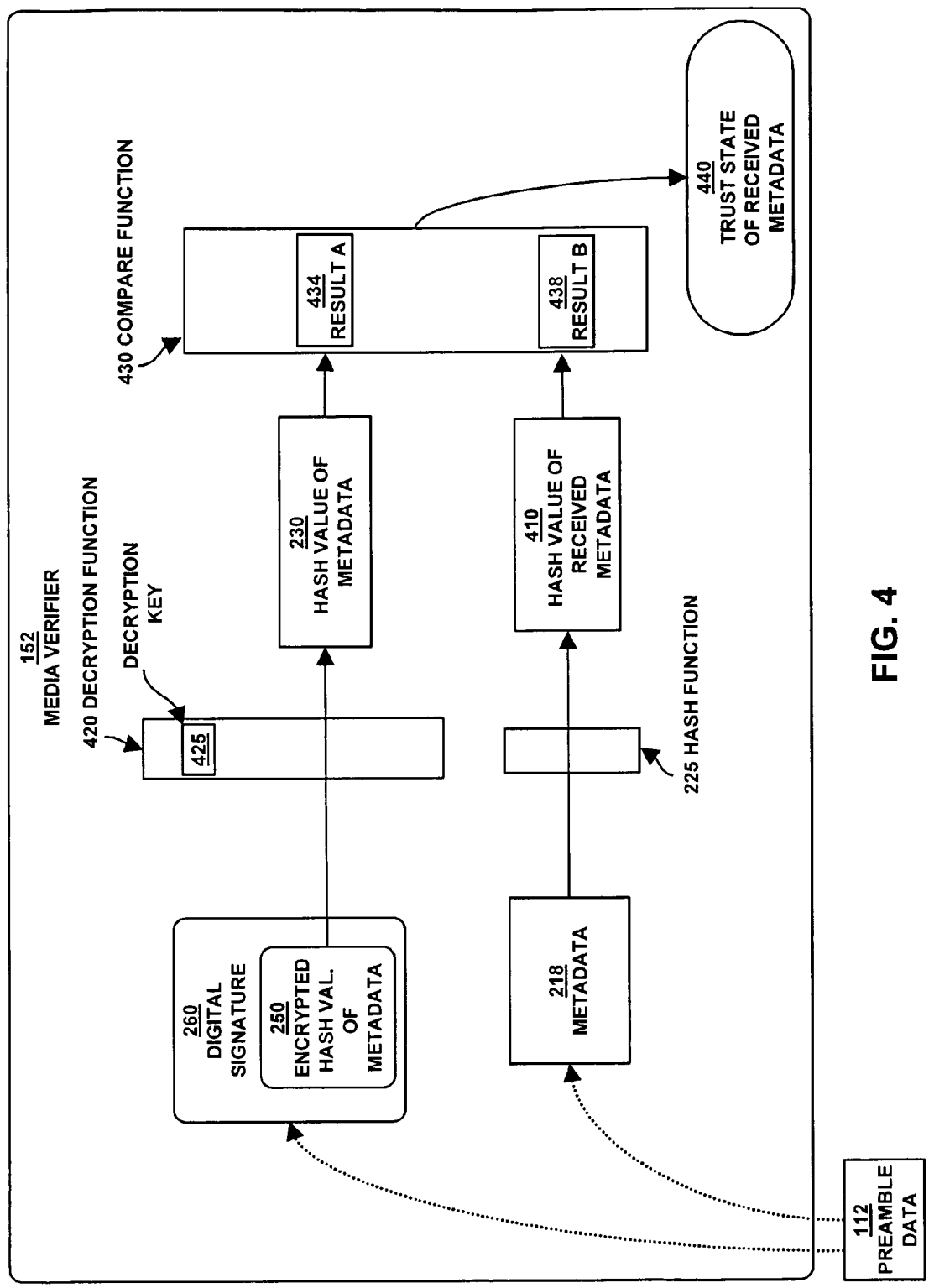
FIG. 4 is a block diagram of an example of a media verifier configured to verify the integrity of received metadata according to embodiments herein.

More specifically, FIG. 4 is a block diagram of an example of a computer system configured with a media verifier 152 for verifying the integrity of received metadata 218 according to embodiments herein. In FIG. 4, the media verifier 152 receives and processes the preamble data 112 prior to playback of content 110.

For example, assume that a user requests to view content 110 (or a portion thereof) on a corresponding media player application. In response to such a request, the media player application retrieves preamble data 112. The media verifier 152 of the media player verifies an integrity of the preamble data 112 as follows:

The media verifier 152 applies a hash function 225 to metadata 218 included in the received preamble data 112. The hash function 225 produces a hash value of received metadata 410. Note that the hash function 225 used by the media verifier 152 is the same hash function 225 used by the media signer 150 as discussed above in FIG. 2 to produce the hash value of metadata 230.

Referring again to FIG. 4, the media verifier 152 also receives a digital signature 260 in the preamble data 112. To decrypt an encrypted hash value 250 provided in the digital signature 260, the media verifier 152 applies a decryption key 425 (e.g. a public key known and used by the media verifier 152) of decryption function 420 to the encrypted hash value of metadata 250 to produce the hash value of metadata 230. Via compare function 430, the media verifier 152 compares the result 434 generated by the decryption function 420 (i.e., the hash value of metadata 230) with the result 438 produced by hash function 225 (i.e., the hash value of received metadata 410). The compare function 430 allows the media verifier 152 to determine a trust state (i.e. the integrity) of the received metadata 440. For example, if the compare function 430 determines that the two result 434 and result 438 are equal, then the metadata 218 received in the preamble data 112 is deemed "trustworthy." If the compare function 430 determines that the result 434 and result 438 are not equal, the metadata 218 is "untrustworthy." In this latter case when the received metadata in preamble 112 is deemed untrustworthy, the media verifier 152 can prevent playback of all portions of the content 110. In the former case, when the received metadata in preamble 112 is deemed trustworthy, the media verifier 152 can implement additional integrity checks whether or not to allow playback of different portions of the content 110 as discussed below in the following figures.

Figure 5:
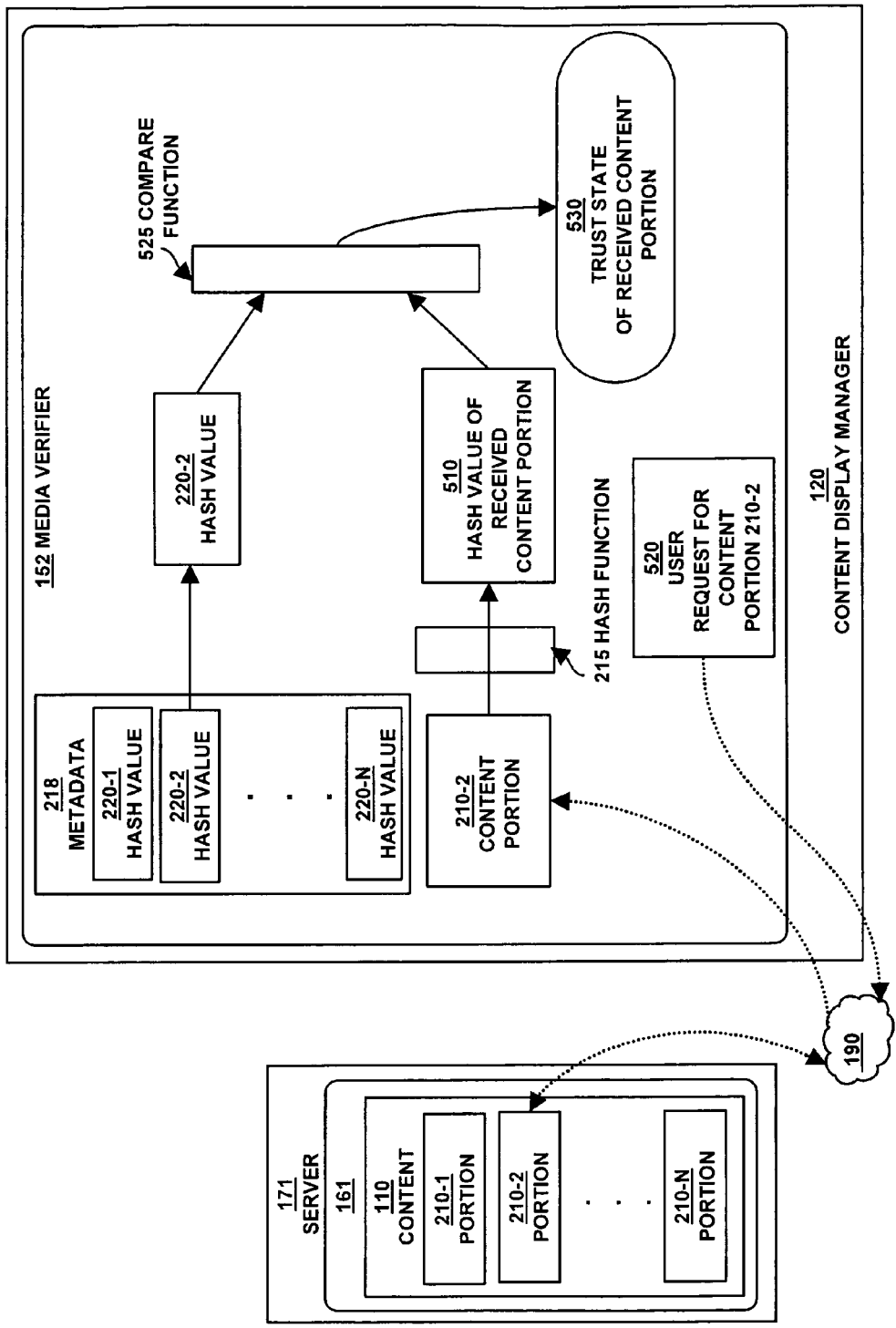
FIG. 5 is a block diagram of an example of a media verifier configured to verify the integrity of a received portion of content according to embodiments herein.

FIG. 5 is a block diagram of an example of a computer system configured with a media verifier 152 verifying the integrity of different received portions 210 of content 110 according to embodiments herein. As FIG. 5 illustrates, when the user sends a request 520 for a particular portion of content 210-2 to server 171, the server 171 retrieves the requested portion 210-2 of content 110 from the content repository 161 and sends portion 210-2 over network 190 (e.g., a packet-switched network such as the Internet) to the content display manager 120.

Via the content display manager 120, the media verifier 152 receives the portion of content 210-2 that was requested by the user. The media verifier 152 applies a hash function 215 to the received portion of content 210-2 to produce a hash value of the received content portion 510. Note again that the retrieved portion 210-2 of content 110 can be a page of a document, segment of video or audio, etc.

To perform the integrity check associated with the portion 210-2 of content 110, the media verifier 152 also extracts the hash value 220-2 from the array of hash values 222. Recall that hash value 220-2 is the hash value in array 222 that corresponds with the received portion of content 210-2.

Compare function 525 of media verifier 152 compares the extracted hash value 220-2 with the hash value of received content portion 510 in order to determine a trust state of the received portion of content 530. If both hash value 220-2 and hash value 510 are equal, then the received portion of content 210-2 is deemed to be "trustworthy". If both hash values 220-2 and hash value 510 are not equal, then the received portion of content 210-2 is deemed to be "untrustworthy." In the former case, when the portion 210-2 of content 110 is deemed trustworthy, the content display manager 120 enables a user to play back the retrieved portion 210-2 of content 110. In the latter case, when the portion of content 110 is deemed untrustworthy, the content display manager 120 disables a user from playing back the retrieved portion 210-2 of content 110.

Note that enabling and disabling of playing the content are shown by way of example and that the verification process as described herein can be used to enable and disable application of other functions to the retrieved content as well.

As discussed above, conventional play back systems can be configured to prevent play back of content by producing a digital signature for a grouping of content as a whole. In order to verify the content using the conventional digital signature, a user must retrieve the content in its entirety and thereafter apply a conventional verifier function to the content as whole to determine whether the content has been tampered with or corrupted.

Example embodiments as discussed herein significantly overcome the deficiencies of conventional applications, enabling a quicker display of content to a viewer. For example, a media verifier 152 performs a multi-level verification check prior to allowing play back of requested content 110.

At a first level of the multi-level verification check, a media verifier 152 first verifies the integrity of a received array of hash values 222 associated with content 110. If this initial verification step fails, the content display manager 120 prevents play back of the content 110 and portions thereof.

At a second level of the multi-level verification check, if the array of hash values 222 is deemed trustworthy in a manner as discussed above, then the content display manager 120 uses the array of hash values 222 to verify individual portions of carry out a second level verification step. For example, the content display manager 120 verifies an integrity of each portion of content prior to play back using the array of hash values 222. Thus, there is no need to download and verify all portions of content 110 prior to playback as required by conventional methods.

Example embodiments are further advantageous over conventional techniques. For example, conventional techniques such as those discussed above in the background do not allow for determining which pages of a document are corrupted and which are still valid because the conventional verification test is based on an entirety of content rather than portions of content. Failure of the conventional verification test results in the inability to view any portions of the content. The user in such circumstances, therefore, may be prevented from viewing a desired page even though it may be that another page in a retrieved document that happens to be corrupted. In contradistinction and according to embodiments herein, if a retrieved array of hash values passes the verification test, then the array of hash values can be used to verify each requested portion of the content on a case-by-case basis. Certain portions of the content may be corrupt while other portions of retrieved content may not be corrupt. Use of incremental security (e.g., the array of hash values 222) enable a user to access and view non-corrupted portions of a document (i.e., content 110) even though other portions of the same document (i.e., content 110) may be corrupted and, therefore, not usable.

Figure 6:
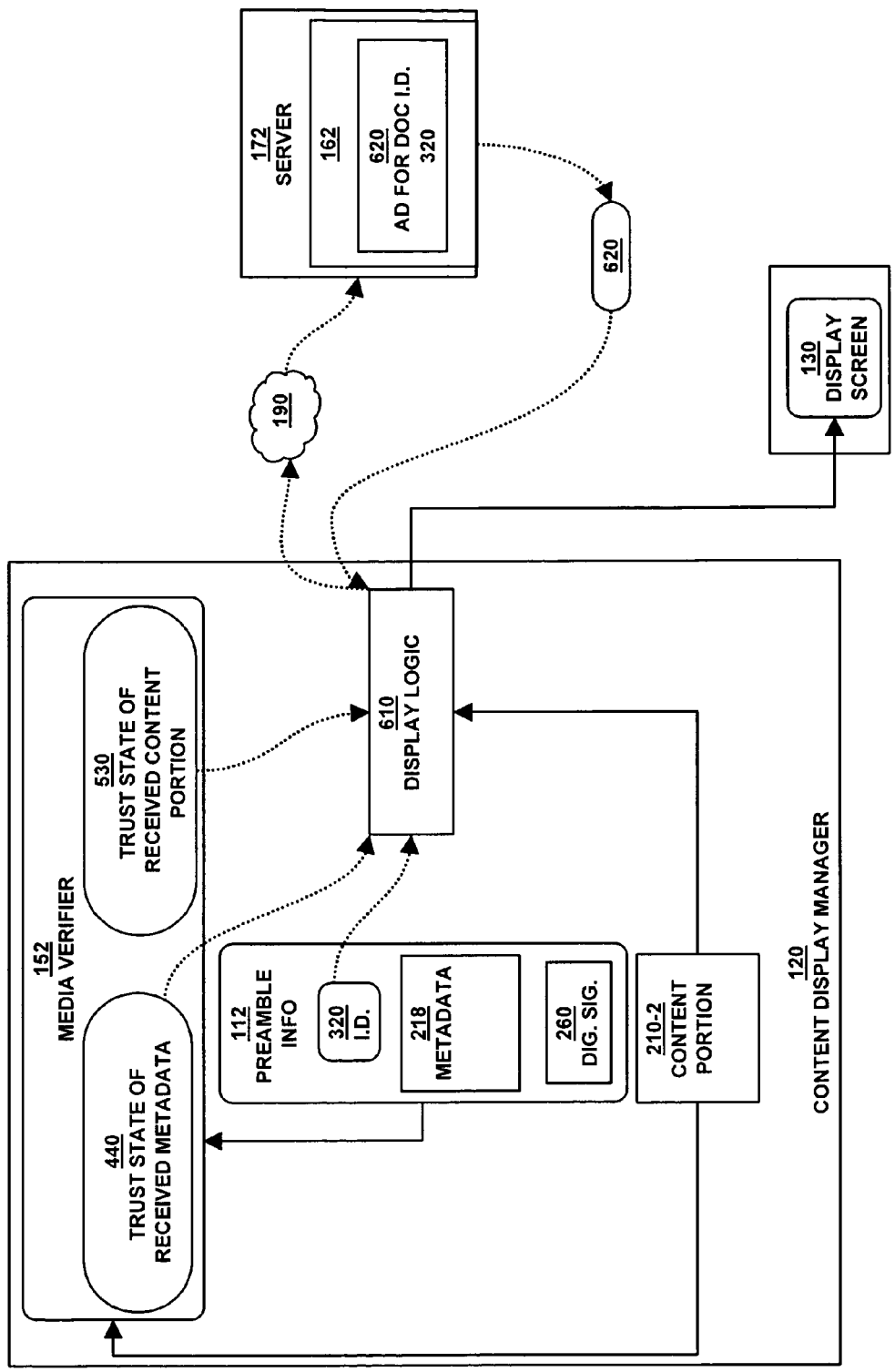
FIG. 6 is a block diagram of an example of a content display manager including a media verifier configured to enable display of verified portions of content and with related advertisement information according to embodiments herein.

FIG. 6 is a block diagram of an example of a computer system configured with a media verifier 152 enabling display of a "trustworthy" portion of content 210-2 with related advertisement information 620 according to embodiments herein.

When the trust state (i.e. the integrity) of received metadata 440 and the trust state (i.e. the integrity) of received content portion 530 are both deemed to be "trustworthy" by the media verifier 152, the content display manager 120 utilizes display logic 610 to display the received portion of content 210-2 on a display screen 130. The media verifier 152 also allows for the document identifier 320 (i.e. the unique identifier value) from the preamble data 112 to be sent to a server 172 that communicates with an advertisement repository 162.

The advertisement repository 162 identifies an advertisement 620 that relates to the subject matter of the "trustworthy" content portion 210-2 being displayed on display screen 130. The server 172 transmits the advertisement 620 to the content display manager 120. The content display manager 120 initiates display of the advertisement 620 along with the "trustworthy" received portion of content 210-2 displayed on the display screen 130. Accordingly, the user can view a retrieved portion of content 110 as well as a corresponding advertisement pertaining to the portion of content being viewed.

Figure 7:
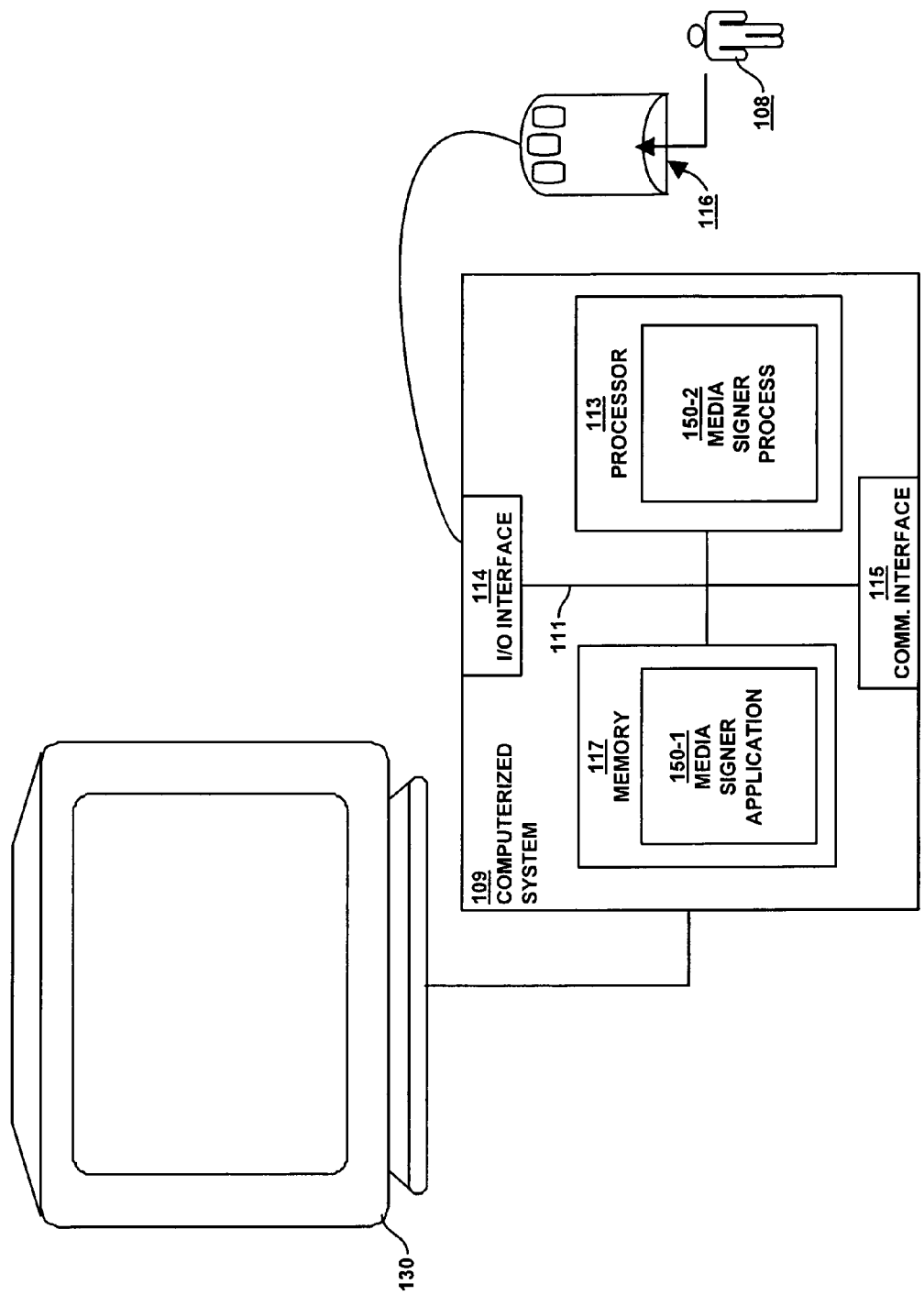
FIG. 7 is an example block diagram illustrating an architecture of a computer system that can be configured to execute a media signer application and/or a media verifier application according to embodiments herein.

FIG. 7 is an example block diagram illustrating an architecture of a computer system that executes, runs, interprets, operates or otherwise performs a media signer application 150-1 and/or media signer process 150-2 (e.g. an executing version of a media signer 150 as controlled or configured by user 108) according to embodiments herein. The media signer 150 can be configured to perform any of the operations associated with media signer 150.

Note that the computer system 110 may be any type of computerized device such as a personal computer, a client computer system, workstation, portable computing device, console, laptop, network terminal, etc. This list is not exhaustive and is provided as an example of different possible embodiments.

In addition to a single computer embodiment, computer system 110 can include any number of computer systems (e.g., one or more computer systems) in a network environment to carry the embodiments as described herein.

As shown in the present example, the computer system 110 includes an interconnection mechanism 111 such as a data bus, motherboard or other circuitry that couples a memory system 117, a processor 113, an input/output interface 114, and a display 130. As discussed, the display screen 130 can be used to present display information such as a requested portion of content and an advertisement. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system.

As mentioned above, depending on the embodiment, the media signer application 150-1 and/or the media signer process 150-2 can be distributed and executed in multiple nodes in a computer network environment or performed locally on a single computer.

The memory system 117 can be any type of computer readable medium (e.g., tangible computer readable medium) and, in this example, is encoded with a media signer application 150-1 that supports corresponding operations as discussed herein.

During operation of the computer system 110, the processor 113 accesses the memory system 117 via the interconnect 111 in order to launch, run, execute, interpret or otherwise perform the logic instructions of the media signer application 150-1. Execution of the media signer application 150-1 in this manner produces the media signer process 150-2. In other words, the media signer process 150-2 represents one or more portions or runtime instances of the media signer application 150-1 (or the entire application 150-1) performing or executing within or upon the processor 113 in the computerized device 110 at runtime.

Those skilled in the art will understand that the computer system 110 may include other processes and/or software and hardware components, such as an operating system.

Display screen 130 need not be coupled directly to computer system 110. For example, the media signer application 150-1 can be executed on a remotely accessible computerized device via the communication interface 115. In this instance, the graphical user interface may be displayed locally to a user 108 of the remote computer, and execution of the processing herein may be client-server based.

FIGS. 8 through 14 include various flowcharts illustrating operations supported by the media signer 150 and the media verifier 152 according to embodiments herein. The rectangular elements shown in flowcharts 800, 900, 1000, 1100, 1200, 1300 and 1400 denote "processing blocks" and represent computer software instructions or groups of instructions upon a computer readable medium. Additionally, the processing blocks represent steps performed by hardware such as a computer, digital signal processor circuit, application specific integrated circuit (ASIC), etc.

Flowcharts 800, 900, 1000, 1100, 1200, 1300 and 1400 do not necessarily depict the syntax of any particular programming language. Rather, flowcharts 800, 900, 1000, 1100, 1200, 1300 and 1400 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 8:
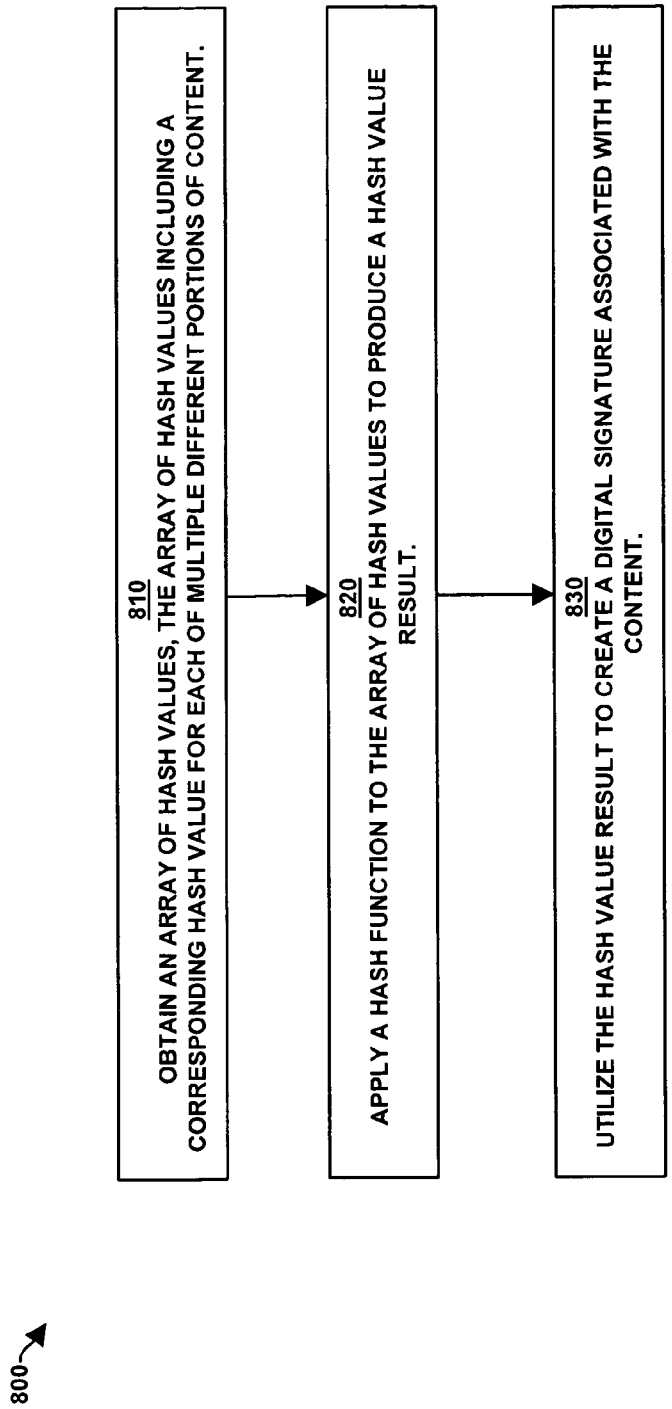
FIG. 8 is a flowchart of an example of processing steps performed by a media signer configured to create a digital signature according to embodiments herein.

Referring now to FIG. 8, FIG. 8 is a flowchart 800 of an example of processing steps performed by the media signer 150 to create a digital signature 260 according to embodiments herein.

At step 810, the media signer 150 obtains an array of hash values 222 including a corresponding hash value 220-1, 220-2 . . . 220-N for each of multiple different portions 210-1, 210-2 . . . 210-N of content 110.

In one embodiment, the media signer 150 generates the array 222 of hash values by retrieving and parsing the content 110 into data (e.g., a portion) that is associated with multiple displayable pages (e.g., portions). For example, the media signer 150 produces a first hash value by hashing data associated with a first displayable page. A second hash value can be produced by hashing data associated with a second displayable page. The media signer 150 then produces the array 222 to include the first hash value and the second hash value.

It is understood that the content 110 can include more than two displayable pages and that the media signer's 150 hash function 215 can produce a hash value corresponding to each displayable page of the content 110 or segments of the content other than pages.

At step 820, the media signer 150 applies a hash function 225 to the array 222 of hash values to produce a hash value result 230.

At step 830, the media signer 150 utilizes the hash value result 230 to create a digital signature 260 associated with the content 110.

It is understood that, for purposes of flowcharts 800, 900, 1000, 1100, 1200, 1300 and 1400, the array 222 of hash values can itself be metadata 218 (or part of metadata 218) that is included in the preamble data 112.

Figure 9:
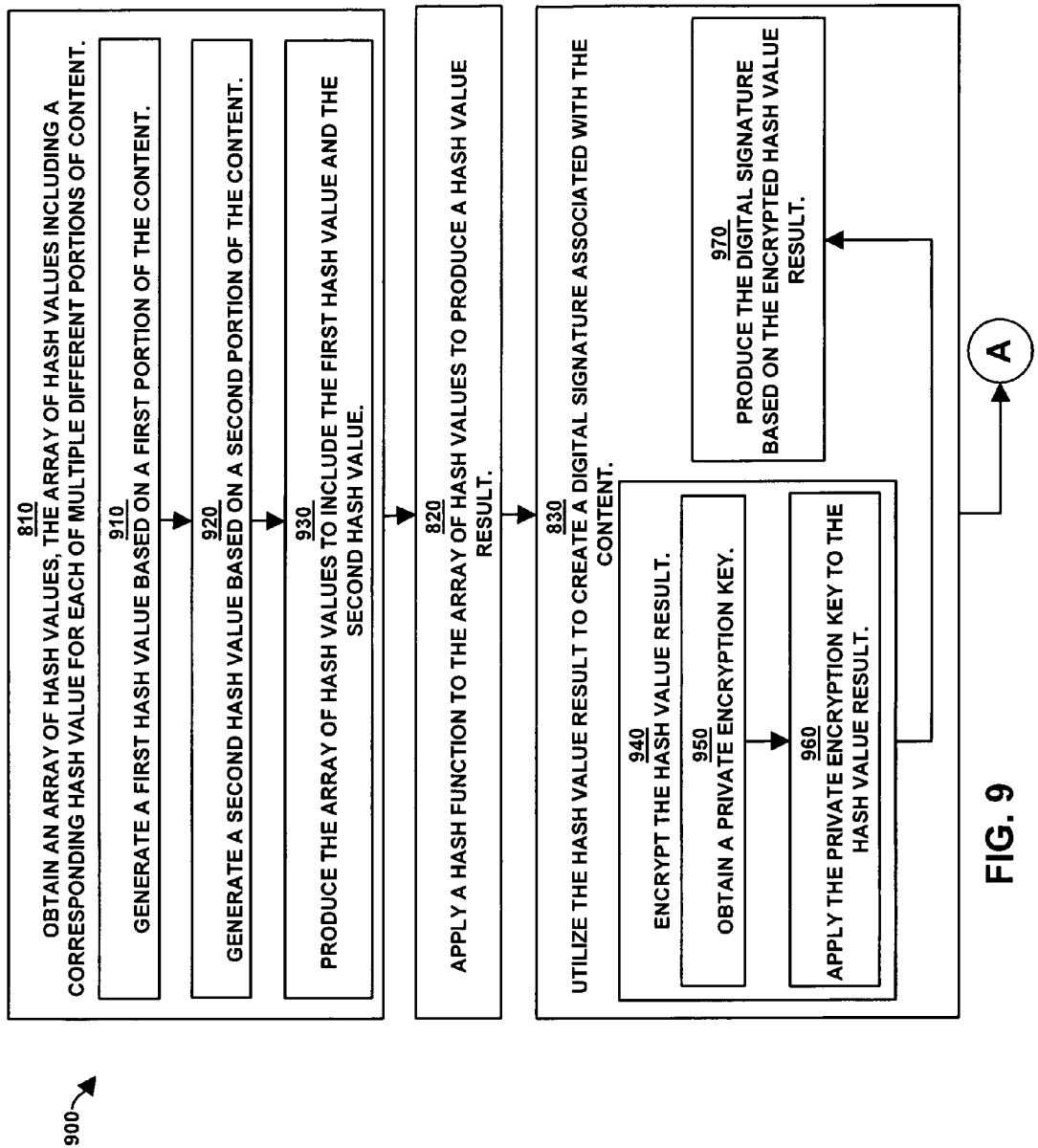
FIGS. 9 and 10 combine to form a flowchart of an example of processing steps performed by a media signer or related functions to produce a digital signature according to embodiments herein.

As illustrated, FIG. 9 is a flowchart 900 of an example of processing steps performed by the media signer 150 to produce the digital signature 260 based on an encrypted hash value result 250 according to embodiments herein.

At step 910, by applying a hash function 215 (e.g. SHA-1 hash function), the media signer 150 generates a first hash value 220-1 based on a first portion 210-1 of the content 110.

At step 920, the media signer 150 similarly generates a second hash value 220-2 based on a second portion 210-2 of the content 110.

At step 930, the media signer 150 produces an array 222 of hash values to include the first hash value 220-1 and the second hash value 220-2 in the array 222. The array 222 can be included in preamble data 112 as metadata 118.

At step 940, after the media signer 150 applies a hash function 225 to the array 222 in order to produce a hash value result 230. The media signer 150 encrypts the hash value result 230, thereby producing a digital signature 260 associated with the content 110.

At step 950, to encrypt the hash value result 230, the media signer 150 obtains a private encryption key 245.

At step 960, the media signer 150 applies the private encryption key 245 to the hash value result 230 during an encryption function 240.

At step 970, the media signer 150 produces the digital signature 260, which is based at least in part on the encrypted hash value result 250. As previously discussed, the digital signature 260 can also be included in the preamble data 112.

Figure 10:
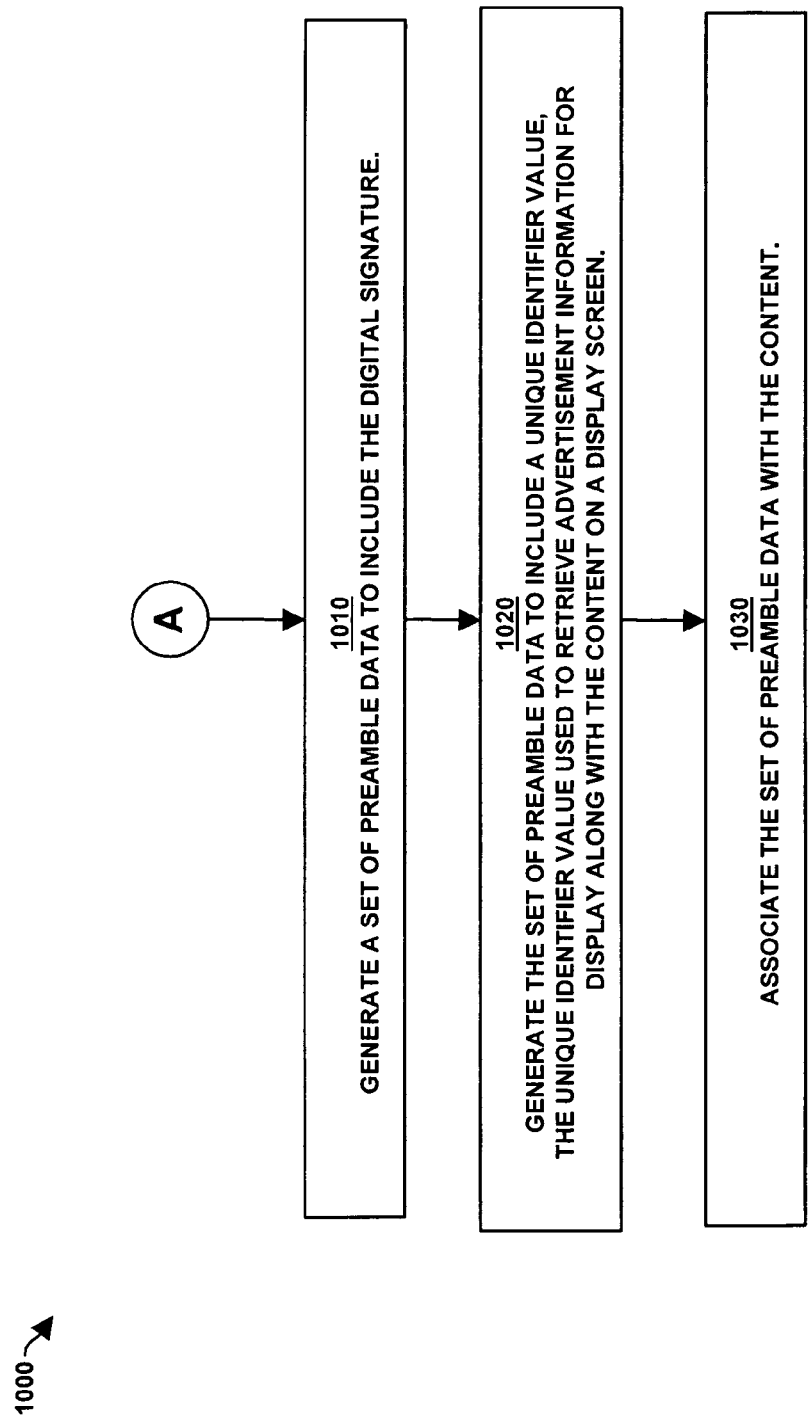

As depicted, FIG. 10 is a flowchart 1000 of an example of processing steps performed by the media signer 150 to generate a set of preamble data 112 according to embodiments herein.

At step 1010, the media signer 150 generates a set of preamble data 112 to include the digital signature 260.

At step 1020, the media signer 150 generates the set of preamble data 112 to include a unique identifier value 320. The unique identifier value 320 is utilized in the retrieval of advertisement information 620 that can be displayed along with "trustworthy" content 110 on a display screen 130.

At step 1030, the media signer 150 associates the set of preamble data 112 with the content 110.

Figure 11:
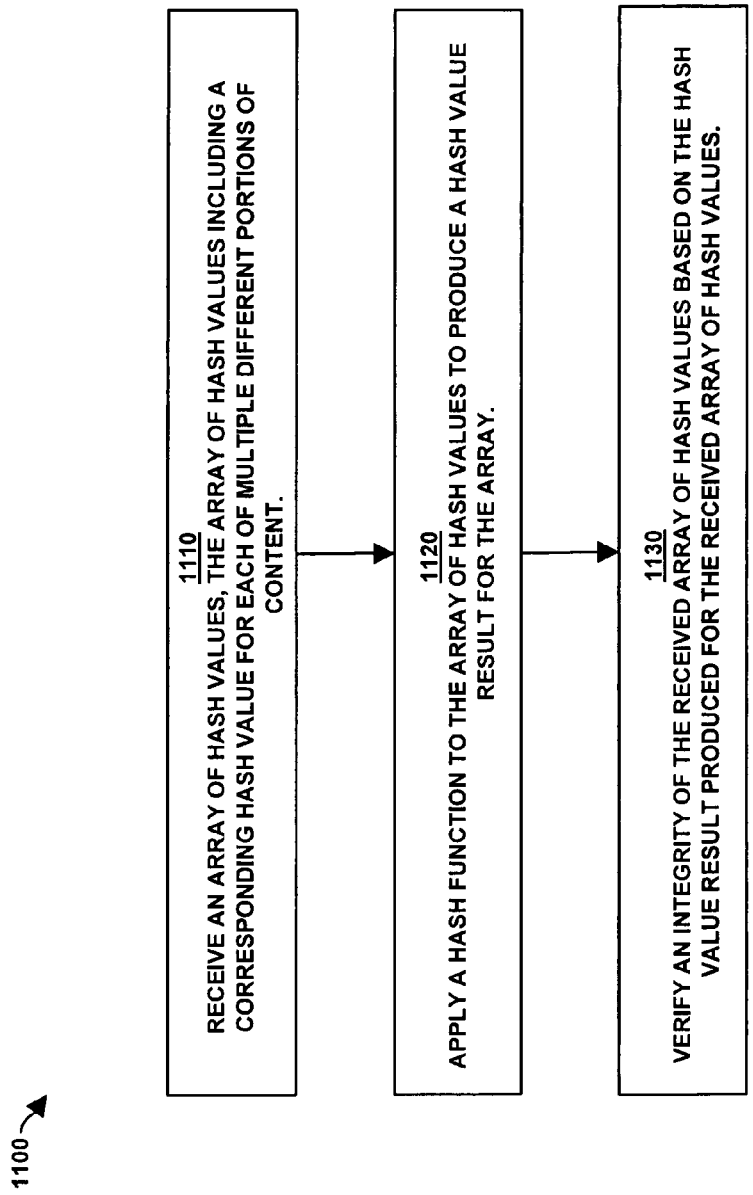
FIG. 11 is a flowchart of an example of processing steps performed by a media verifier configured to verify the integrity of a received array of hash values according to embodiments herein.

Turning now to FIG. 11, FIG. 11 is a flowchart 1100 of an example of processing steps performed by the media verifier 152 to verify the integrity of a received array 222 of hash values according to embodiments herein.

At step 1110, the media verifier 152 receives an array 222 of hash values. The array 222 of hash values includes a corresponding hash value 220-1, 220-2 . . . 220-N for each of multiple different portions 210-1, 210-2 . . . 210-N of content 110. The array 222 can be metadata 218 in a set of preamble data 112 associated with the content 110.

At step 1120, the media verifier 152 applies a hash function 225 to the array 222 of hash values to produce a hash value result 410 for the array 222.

At step 1130, the media verifier 152 verifies the integrity of the received array 222 of hash values. Determining the received array's 222 integrity is based on the hash value result 410 produced for the received array 222.

Figure 12:
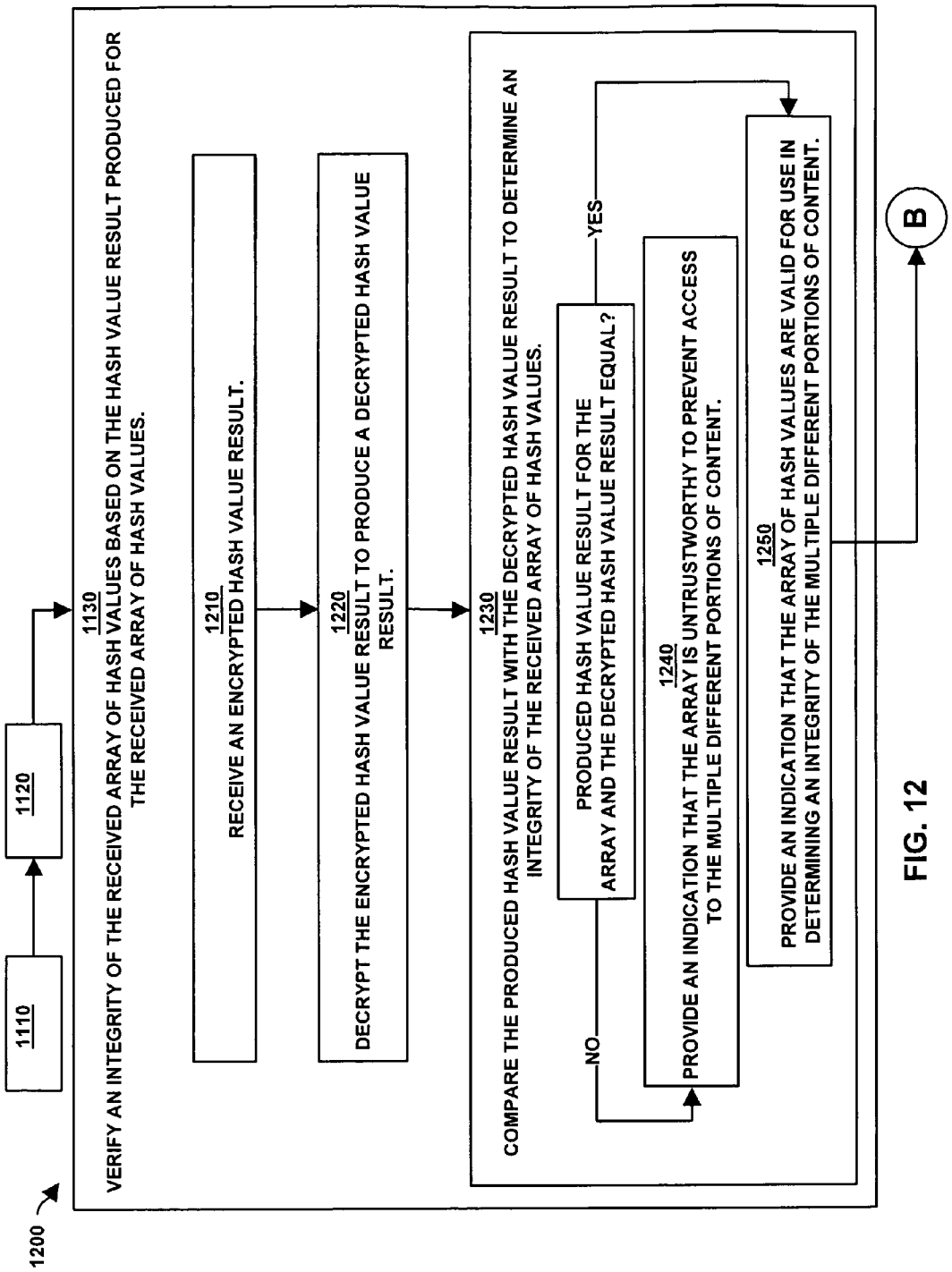

FIG. 12 is a flowchart 1200 of an example of processing steps performed by the media verifier 152 to determine whether the array 222 of hash values is trustworthy according to embodiments herein.

At step 1210, the media verifier 152 receives an encrypted hash value result 250 in the preamble data 112.

At step 1220, the media verifier 152 decrypts the encrypted hash value result 250 to produce a decrypted hash value result 230.

At step 1230, the media verifier 152 compares the produced hash value result 410 for the array 222 with the decrypted hash value result 230 to determine an integrity of the received array 222 of hash values.

At step 1240, upon determining that both hash value results 410, 230 are not equal, the media verifier 152 provides an indication that the array 222 is "untrustworthy" in order to prevent access to the multiple different portions 210-1, 210-2 . . . 210-N of content 110.

Upon determining that the produced hash value result 410 and the decrypted hash value result 230 are equal, at step 1250, the media verifier 152 provides an indication that the array 222 of hash values is valid for use in determining an integrity of any of the multiple different portions 210-1, 210-2 . . . 210-N of content 110.

Figure 13:
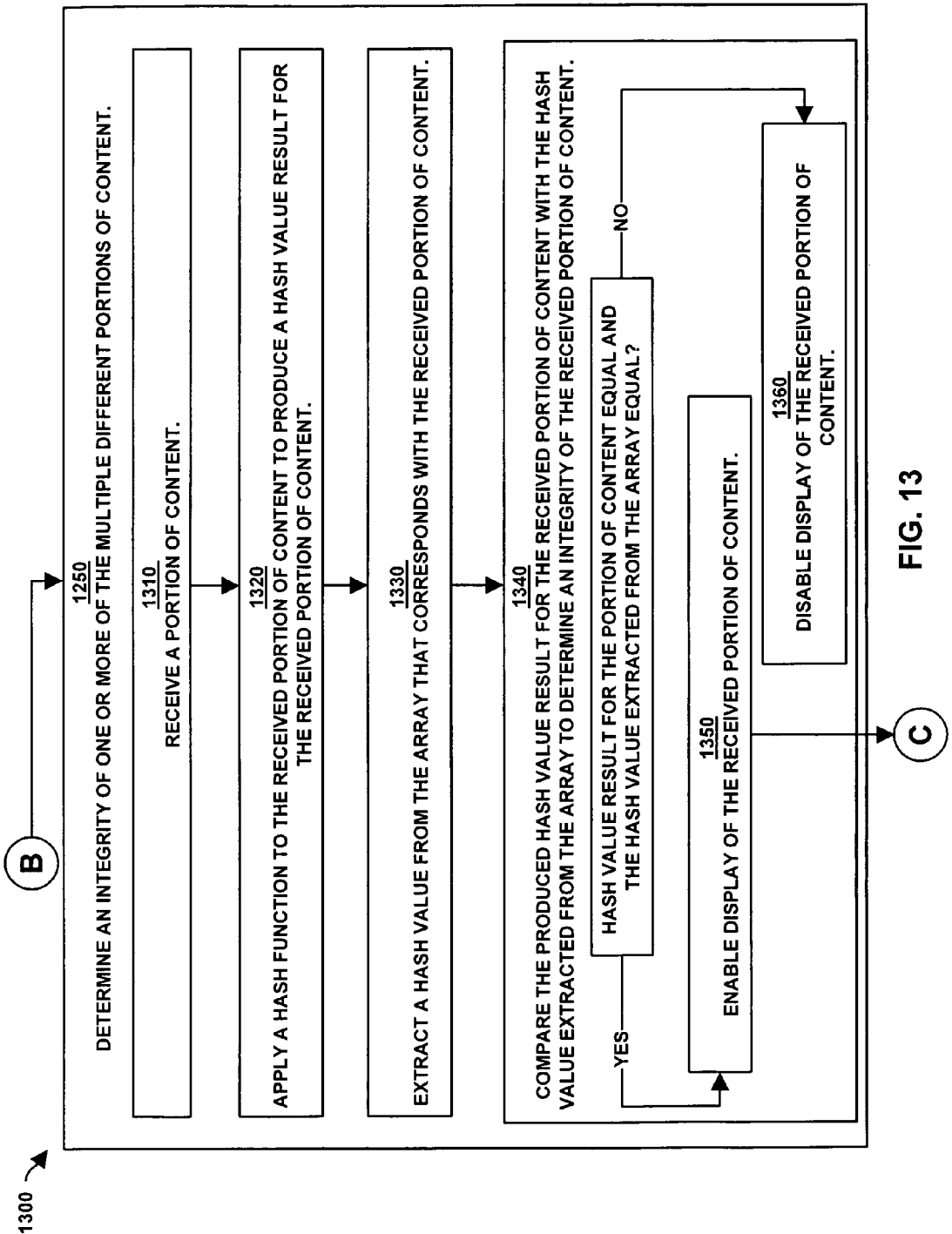

FIG. 13 is a flowchart 1300 of an example of processing steps performed by the media verifier 152 to enable display of a received portion 210-2 of content 110 that is determined to be "trustworthy" according to embodiments herein.

At step 1310, the media verifier 152 receives portions 210-1, 210-2 . . . 210-N of content 110 from a server 171 that communicates with a content repository 161.

At step 1320, the media verifier 152 applies a hash function 215 to a received portion 210-2 of content 110 to produce a hash value result 510 for that received portion 210-2 of content 110.

At step 1330, the media verifier 152 extracts a hash value 220-2 from the array 222 that corresponds with the received portion 210-2 of content 110.

At step 1340, in order to determine the integrity of the received portion 210-2 of content 110, the media verifier 152 compares the produced hash value result 510 for the received portion 210-2 of content 110 with the hash value 220-2 extracted from the array 222.

If the hash value result 510 for the received portion 210-2 of content 110 is equal to the hash value 220-2 extracted from the array 222, at step 1350, the media verifier 152 enables display of the received portion 210-2 of content 110.

At step 1360, the media verifier 152 disables display of the received portion 210-2 of content 110 if its hash value result 510 is not equal to the hash value 220-2 extracted from the array 222.

As presented, FIG. 14 is a flowchart 1400 of an example of processing steps performed by the media verifier 152 to display an advertisement 620 with a "trustworthy" retrieved portion 210-2 of content 110 according to embodiments herein.

As previously discussed, an array 222 arrives at the media verifier 152 as metadata 218 within the preamble data 112. The array 222 includes a hash value 220-2 that corresponds with the retrieved portion 210-2 of content.

At step 1410, via use of the hash value 220-2 that corresponds with the retrieved portion 210-2 of content, the media verifier 152 detects that the retrieved portion 210-2 of content 110 has not been modified by an unauthorized source and is therefore "trustworthy."

At step 1420, because the retrieved portion 210-2 of content 110 is "trustworthy," the media verifier 152 displays the retrieved portion 210-2 of content 110 on a display screen 130.

At step 1430, as the media verifier 152 decides to display the retrieved portion 210-2 of content 110, the media verifier 152 extracts the unique identifier 320 from the set of preamble data 112.

At step 1440, the media verifier 152 transmits the unique identifier 320 to a server 172, which stores advertisements 620 associated with the unique identifier 320.

At step 1450, the media verifier 152 receives an advertisement(s) 620 from the server 172 based on the unique identifier 320.

At step 1460, the media verifier 152 displays the advertisement(s) 620 with the retrieved portion 210-2 of content 110.

Note again that techniques herein are well suited for a environment 100 with a media signer 150 and a media verifier 152. The environment 100 detects whether a portion 210-1, 210-2 . . . 210-N of content 110 has been altered by an unauthorized source without requiring access to the content 110 in its entirety. Further, the environment 100 allows access to non-corrupted portions 210-2 of content even though other portions may be corrupted.

Note again that the embodiments described herein are not limited to a particular hardware or software configuration, and may find applicability in many different computing or processing environments. For example, embodiments herein can be implemented in hardware or software, or a combination of hardware and software.

Note further that embodiments herein can be implemented in one or more computer programs, where a computer program may be understood to include one or more processor executable instructions. As discussed above, such computer program(s) may be executed on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

The device(s) or computer systems may include, for example, a personal computer(s), workstation(s) (e.g., Sun, HP, etc.), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method comprising:
   receiving, by a computing device, an array of hash values for respective portions of content, each of the portions being individual pages of a document or individual segments of audio or visual data;
   applying, by the computing device, a hash function to the array of hash values to produce a hash value result for the array;
   verifying, by the computing device, an integrity of the received array of hash values based on the hash value result produced for the received array of hash values; and
   based on verifying the integrity of the received array of hash values:
      retrieving a first portion of the content and a second portion of the content;
      displaying the first portion of the content based on determining that a first hash value result generated by applying a hash function to the first portion of the content is equal to a first hash value from the array that corresponds to the first portion of the content; and
      preventing display of the second portion of the content based on determining that a second hash value result generated by applying a hash function to the second portion of the content is different from a second hash value from the array that corresponds to the second portion of the content.

2. The method as in claim 1, wherein verifying the integrity of the received array of hash values includes:
   receiving an encrypted hash value result;
   decrypting the encrypted hash value result to produce a decrypted hash value result; and
   comparing the produced hash value result with the decrypted hash value result to determine an integrity of the received array of hash values.

3. The method as in claim 2, wherein comparing the produced hash value result with the decrypted hash value result to determine the integrity of the array includes:
   upon determining that the produced hash value result and the decrypted hash value result are equal, providing an indication that the array of hash values are valid for use in determining an integrity of the portions of content.

4. The method as in claim 3, wherein determining an integrity of the portions of content includes:
   receiving a portion of content;
   applying a hash function to the portion of content to produce a hash value result for the portion of content;
   extracting a hash value from the array that corresponds with the portion of content; and
   comparing the produced hash value result for the portion of content with the hash value extracted from the array to determine an integrity of the received portion of content.

5. The method as in claim 1, wherein receiving the array of hash values includes:
   receiving the array of hash values in a set of preamble data associated with the content, the set of preamble data including a unique identifier for use in retrieval of advertising information associated with the content.

6. The method of claim 5 further comprising:
   in response to detecting that a retrieved portion of the content has not been modified by an unauthorized source via use of a corresponding one of the array of hash values:
      displaying the retrieved portion of the content;
      extracting the unique identifier from the set of preamble data;
      transmitting the unique identifier to a server, the server storing at least one advertisement associated with the unique identifier;
      receiving an advertisement from the server based on the unique identifier; and
      displaying the advertisement with the retrieved portion of the content.

7. The method as in claim 1, wherein
   the first hash value is generated based on applying a hash function to the first portion of the content and
   the second hash value is generated based on applying a hash function to the second portion of the content.

8. A non-transitory computer readable medium comprising executable instructions encoded thereon operable on a computerized device to perform processing comprising:
   instructions for receiving an array of hash values respective portions of content comprising non-executable data that is displayable by a computing device;
   instructions for applying a hash function to the array of hash values to produce a hash value result for the array;
   instructions for verifying an integrity of the received array of hash values based on the hash value result produced for the received array of hash values; and
   instructions for performing, based on verifying the integrity of the received array of hash values, operations comprising:
      retrieving a first portion of the content and a second portion of the content;
      displaying the first portion of the content based on determining that a first hash value result generated by applying a hash function to the first portion of the content is equal to a first hash value from the array that corresponds to the first portion of the content; and preventing display of the second portion of the content based on determining that a second hash value result generated by applying a hash function to the second portion of the content is different from a second hash value from the array that corresponds to the second portion of the content.

9. The computer readable medium as in claim 8, wherein the instructions for verifying the integrity of the received array of hash values include:

instructions for receiving an encrypted hash value result;

instructions for decrypting the encrypted hash value result to produce a decrypted hash value result; and instructions for comparing the produced hash value result with the decrypted hash value result to determine an integrity of the received array of hash values.

10. The computer readable medium as in claim 9, wherein the instructions for comparing the produced hash value result with the decrypted hash value result to determine the integrity of the array of hash values include:

instructions for, upon determining that the produced hash value result for the array and the decrypted hash value result are not equal, providing an indication that the array is untrustworthy to prevent access to the portions of content.

11. The computer readable medium as in claim 9, wherein the instructions for comparing the produced hash value result with the decrypted hash value result to determine the integrity of the array include:

instructions for, upon determining that the produced hash value result and the decrypted hash value result are equal, providing an indication that the array of hash values are valid for use in determining an integrity of the portions of content.

12. The computer readable medium as in claim 11, wherein the instructions for determining an integrity of the portions of content include:

instructions for receiving a portion of content; instructions for applying a hash function to the portion of content to produce a hash value result for the portion of content;

instructions for extracting a hash value from the array that corresponds with the portion of content; and instructions for comparing the produced hash value result for the portion of content with the hash value extracted from the array to determine an integrity of the received portion of content.

13. The computer readable medium as in claim 8, wherein the instructions for receiving the array of hash values include:

instructions for receiving the array of hash values in a set of preamble data associated with the content, the set of preamble data including a unique identifier for use in retrieval of advertising information associated with the content.

14. The computer readable medium of claim 13 further comprising;

instructions for, in response to detecting that a retrieved portion of the content has not been modified by an unauthorized source via use of a corresponding one of the array of hash values;

displaying the retrieved portion of the content;

extracting the unique identifier from the set of preamble data;

transmitting the unique identifier to a server, the server storing at least one advertisement associated with the unique identifier;

receiving an advertisement from the server based on the unique identifier; and displaying the advertisement with the retrieved portion of the content.

15. The computer readable medium as in claim 8, wherein the first hash value is generated based on applying a hash function to the first portion of the content and the second hash value is generated based on applying a hash function to the second portion of the content.

16. A computer system comprising:

a processor;

a memory unit that stores instructions associated with an application executed by the processor; and an interconnect coupling the processor and the memory unit and enabling the computer system to execute the application and perform operations of:

obtaining an array of hash values for respective portions of content, each of the portions being individual pages of a document or individual segments of audio or visual data;

applying a hash function to the array of hash values to produce a hash value result;

verifying an integrity of the received array of hash values based on the hash value result produced for the received array of hash values; and based on verifying the integrity of the received array of hash values:

retrieving a first portion of the content and a second portion of the content;

displaying the first portion of the content based on determining that a first hash value result generated by applying a hash function to the first portion of the content is equal to a first hash value from the array that corresponds to the first portion of the content; and preventing display of the second portion of the content based on determining that a second hash value result generated by applying a hash function to the second portion of the content is different from a second hash value from the array that corresponds to the second portion of the content.

* * * * *